April 20, 1926.
T. J. E. GRAY
1,581,439
POWER TRANSMISSION MEANS
Filed May 21, 1925
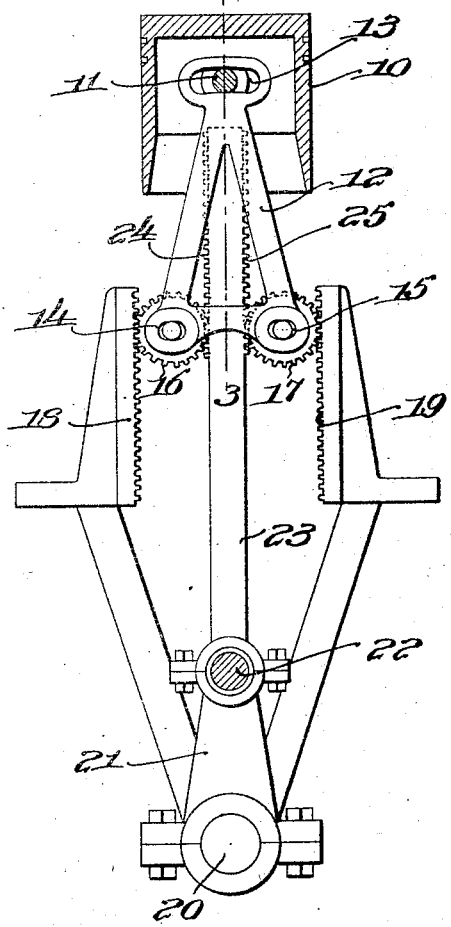
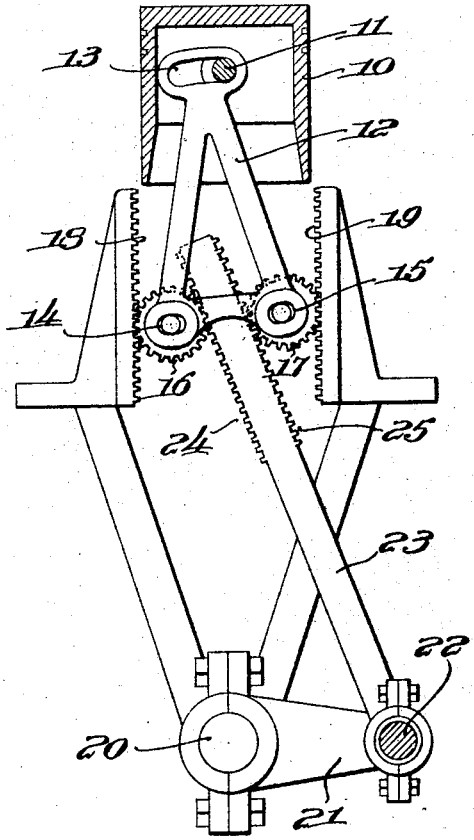
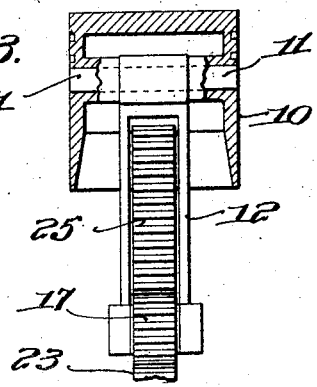
Inventor:
Thaddeus J. E. Gray,
by Edward F. Allen
his Atty.

Patented Apr. 20, 1926.

1,581,439

UNITED STATES PATENT OFFICE.

THADDEUS J. E. GRAY, OF EVANSVILLE, INDIANA.

POWER-TRANSMISSION MEANS.

Application filed May 21, 1925. Serial No. 31,940.

*To all whom it may concern:*

Be it known that I, THADDEUS J. E. GRAY, a citizen of the United States of America, and a resident of Evansville, in the county of Vanderburg and State of Indiana, have invented certain new and useful Improvements in Power-Transmission Means, of which the following is a specification.

This invention relates to the transmission of power and more particularly to the transmission of power in engines or machines of the reciprocating type.

An object of the invention is to so construct and arrange certain mechanical devices that a greater amount of useful work may be performed by a given expenditure of initial energy with less resulting vibration than has been possible in known devices of this class.

It is a further object of the invention to produce power transmission means of simple structure and compactness in arrangement, which may be applied to existing engines and machines if desired.

The invention further consists in certain novel features of construction and arrangement of parts which will be fully understood from a description of the drawings and the claims hereinafter given.

Of the drawings:

Figure 1 represents a sufficient portion of an engine, partly in section, to enable the invention to be understood.

Figure 2 is a view similar to Figure 1 but showing certain of the parts in other positions.

Figure 3 is a detail partly in section taken on the line 3—3 Figure 1.

Referring to the drawings:

The drawings herewith illustrate the invention as applied to one type of reciprocating engine, but it will be understood that it is not the intention to limit the invention thereto, as it is possible to utilize it in various ways and makes or types of engines and in other branches of mechanical industry not deemed necessary to show.

The piston 10, of any usual or suitable type or make, and arranged to travel in a cylinder not shown, is provided with the usual wrist pin 11 upon which is slidingly mounted a thrust delivery member 12 the upper end of which is slotted as at 13 to receive the said pin 11 and at its lower end as at 14 and 15 to receive the trunnions of gears 16 and 17.

Fast to the engine frame, not shown, are the stationary racks 18 and 19 with which the gears 16 and 17 are in mesh.

The crank shaft 20 has fast thereto the usual crank arm 21 but in this instance the said arm between centers is equal in length to the stroke of the piston 10.

Secured to the arm 21 in a pivotal manner, by the pin 22, is a pitman 23 the upper portion of which has the racks 24 and 25 arranged to be engaged and driven by the gears 16 and 17.

From the foregoing it will be readily seen that a downward movement of the piston 10 from its position shown in Figure 1 to that shown in Figure 2 will cause the gears 16 and 17 to roll on their respective racks 18 and 19, and impart downward movement to the pitman 23 at an accelerated speed equal to approximately double that of the piston 10.

During the cycle of the arm 21 the said pitman 23 is made to assume constantly changing angles relatively to the direction of movement of the piston 10 and to compensate for these changes the thrust member 12 is employed.

As seen in Figure 2 the angle of the pitman 23 is such that the gear 16 is further advanced than the gear 17, due to the automatic shifting of the member 12 when the angle of the pitman changes, which enables the gears to be in constant mesh with their respective racks, and in driving contact regardless of the angularity of said pitman.

By the use of the above described arrangement it will be readily understood that an engine of a given piston stroke, actuated by a known degree of energy or power, will deliver or accomplish an amount of work with less attendant vibration than that of the usual engine arrangement actuated by a like degree of energy or power.

It will also be very evident that a given amount of work may be accomplished at less expenditure of initial power than in the usual engine because of the above arrangement, which is such as to eliminate the tendency to cause the cylinders to assume an elliptical internal shape, due to the energy wasting side thrusts of the pitman, conveyed to the piston, by devices which automatically relieve the piston thereof and direct them to rolling surfaces where their energy is utilized rather than wasted.

The devices just referred to include the shiftable thrust member 12 and the gears 16 and 17, the arrangement of which is such that relative movements between them and the piston 10 relieve the piston of the side thrusts heretofore imparted by the pitman, and transfer them to the gears, the rotation of which is aided thereby, and consequently previous power loss is now turned to gain at that point, and the reboring of cylinders that have become elliptical through the wear imposed by the said thrusts becomes unnecessary.

Having described the invention I claim:

1. Power transmitting means for reciprocating engines comprising a piston; a thrust member carried by said piston; a pitman; a crank shaft; a crank thereon in engagement with said pitman; stationary racks; gears carried by said thrust member and arranged to engage and roll on said racks; said pitman having racks thereon arranged to engage said gears; and means forming part of said thrust member whereby said gears will remain in engagement with said racks regardless of the position of said pitman.

2. Power transmission means for reciprocating engines comprising a piston; a thrust member having a slot to engage a wrist pin; a wrist pin carried by said piston; a crank shaft; a crank thereon; a pitman engaging said crank and having a rack formed on each of two edges thereof; gears carried by said thrust member and arranged to each engage a rack of said pitman; stationary racks arranged to be engaged by said gears; said gears being so mounted in said thrust member, and said thrust member being so mounted on said wrist pin, that said gears will continuously engage with their respective racks regardless of the angle of said pitman.

Signed by me at Evansville, Indiana, this 9th day of May, 1925.

THADDEUS J. E. GRAY.